(12) United States Patent
Korinek et al.

(10) Patent No.: US 9,738,424 B2
(45) Date of Patent: Aug. 22, 2017

(54) MOLDED FIBER PACKAGING

(71) Applicant: Apple Inc., Cupertino, CA (US)

(72) Inventors: Michael Korinek, San Francisco, CA (US); Mikael Silvanto, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 14/328,974

(22) Filed: Jul. 11, 2014

(65) Prior Publication Data

US 2016/0009473 A1    Jan. 14, 2016

(51) Int. Cl.
| | | |
|---|---|---|
| B65D 77/26 | (2006.01) | |
| B65D 43/02 | (2006.01) | |
| B65D 81/133 | (2006.01) | |
| B65D 81/02 | (2006.01) | |
| B65D 5/52 | (2006.01) | |

(52) U.S. Cl.
CPC ....... *B65D 43/0222* (2013.01); *B65D 81/025* (2013.01); *B65D 81/133* (2013.01); *B65D 5/528* (2013.01); *B65D 2543/00194* (2013.01); *B65D 2543/00231* (2013.01); *B65D 2543/00268* (2013.01); *B65D 2543/00361* (2013.01); *B65D 2543/00527* (2013.01); *B65D 2543/00537* (2013.01); *Y02W 90/13* (2015.05)

(58) Field of Classification Search
CPC ........ B65D 5/00; B65D 5/503; B65D 81/113; B65D 81/133; B65D 2581/055; B65D 77/26; B65D 2543/00268; B65D 2543/00361; B65D 2575/3272; B65D 85/00; B65D 81/025; B65D 5/528; B65D 5/52; B29K 2105/04; B29K 2105/256; B29L 2031/712; B29L 2031/7138; B65B 61/00; B65B 43/42
USPC ....... 206/586, 592, 453, 521, 577, 587, 588, 206/523, 730, 732, 735; 220/528, 920; 248/345.1; 217/53
See application file for complete search history.

(56) References Cited

U.S. PATENT DOCUMENTS

| | | | | |
|---|---|---|---|---|
| 1,476,474 | A | * 12/1923 | Stahfest ................. | A45C 11/34 206/45.2 |
| 1,553,827 | A | * 9/1925 | Lee ......................... | B65D 5/52 206/349 |
| 2,000,158 | A | 5/1935 | Black et al. | |
| 2,216,339 | A | * 10/1940 | De Reamer ............ | B65D 5/503 206/433 |
| 2,418,248 | A | * 4/1947 | Denton .................. | B65D 5/503 206/521.1 |
| 2,458,898 | A | 1/1949 | Di Addario | |
| 2,564,948 | A | * 8/1951 | Beck, Jr. ................. | B65D 5/00 206/392 |

(Continued)

*Primary Examiner* — Anthony Stashick
*Assistant Examiner* — Mollie Impink
(74) *Attorney, Agent, or Firm* — Sterne, Kessler, Goldstein & Fox P.L.L.C.

(57) ABSTRACT

Packaging used to hold and ship consumer products may include components having complementary edges that are coupled together when the packaging is assembled. The packaging may also display a product in an aesthetically appealing way by holding the product in way that makes it appear as if the product is "floating." The packaging may be made of recyclable and/or biodegradable material, such as molded fiber paper material that reduces the environmental impact of the packaging.

30 Claims, 13 Drawing Sheets

(56) References Cited

U.S. PATENT DOCUMENTS

| | | | |
|---|---|---|---|
| 2,663,417 A | 12/1953 | Kincaid | |
| 2,812,854 A | 11/1957 | Fletcher | |
| 2,979,246 A | 4/1961 | Liebeskind | |
| 3,047,137 A | 7/1962 | Kindseth | |
| 3,478,867 A * | 11/1969 | Weiss | B65D 1/36 206/503 |
| 3,587,838 A | 6/1971 | Yoshimasa | |
| 3,752,384 A | 8/1973 | Siburn | |
| 3,796,304 A | 3/1974 | Blais | |
| 3,807,622 A | 4/1974 | Belcher et al. | |
| 3,899,072 A * | 8/1975 | Reinhart | B65D 5/503 206/351 |
| 4,016,972 A * | 4/1977 | Szamborski | B65D 75/32 206/348 |
| 4,019,636 A | 4/1977 | Wise | |
| 4,085,845 A * | 4/1978 | Perfect | B65D 81/133 206/363 |
| 4,093,068 A * | 6/1978 | Smrt | B65D 81/127 206/433 |
| 4,111,302 A * | 9/1978 | Roth | A61F 6/14 206/363 |
| 4,141,466 A * | 2/1979 | Gordon | B29C 51/04 206/521 |
| 4,194,682 A * | 3/1980 | Congleton | B65D 85/32 206/521.1 |
| 4,482,053 A * | 11/1984 | Alpern | A61L 2/26 206/439 |
| 4,482,054 A | 11/1984 | Gardner | |
| 4,511,035 A * | 4/1985 | Alpern | A61B 17/0682 206/339 |
| 4,522,303 A * | 6/1985 | Starr | B65D 81/1075 206/305 |
| 4,577,757 A * | 3/1986 | Hustad | B65D 75/322 206/461 |
| 4,583,639 A * | 4/1986 | Fedick | B65D 85/48 206/325 |
| 4,640,418 A * | 2/1987 | Lowry | B65D 5/509 206/499 |
| 4,697,703 A * | 10/1987 | Will | A61F 2/0095 206/363 |
| 4,742,916 A | 5/1988 | Galea | |
| 4,750,619 A * | 6/1988 | Cohen | A61F 2/0095 206/363 |
| 4,767,003 A * | 8/1988 | Rice | H05K 9/0067 206/232 |
| 4,778,056 A * | 10/1988 | Faulstick | B65D 5/503 206/449 |
| 4,801,018 A | 1/1989 | Wilde | |
| 4,824,041 A | 4/1989 | Myers | |
| 4,869,369 A | 9/1989 | Turngren | |
| 4,877,673 A | 10/1989 | Eckel et al. | |
| 4,883,179 A | 11/1989 | Dionne | |
| 5,040,678 A * | 8/1991 | Lenmark, Sr. | B65D 81/107 206/204 |
| 5,071,009 A | 12/1991 | Ridgeway | |
| 5,129,514 A | 7/1992 | Lilley, Jr. | |
| 5,168,996 A * | 12/1992 | Johnson | B65D 5/5028 206/460 |
| 5,226,543 A * | 7/1993 | Foos | B65D 5/503 206/320 |
| 5,251,760 A * | 10/1993 | Smith | B65D 5/5028 206/583 |
| 5,295,580 A * | 3/1994 | Hicks | B65D 5/5054 206/588 |
| 5,335,770 A | 8/1994 | Baker et al. | |
| D369,295 S * | 4/1996 | Kobari | D9/423 |
| 5,657,955 A | 8/1997 | Adams | |
| 5,711,426 A | 1/1998 | Kuhn et al. | |
| 6,039,495 A * | 3/2000 | Zimmerman | B42F 13/40 206/461 |
| 6,053,321 A * | 4/2000 | Kayser | B65D 43/162 206/470 |
| 6,073,770 A | 6/2000 | Park | |
| 6,142,304 A | 11/2000 | Moren et al. | |
| 6,261,653 B1 | 7/2001 | Smith | |
| 6,305,539 B1 * | 10/2001 | Sanders, Jr. | B65D 5/6664 206/320 |
| 6,308,833 B1 * | 10/2001 | Oravez | B65D 77/0486 206/541 |
| 6,330,945 B1 * | 12/2001 | Reimer | B65D 75/22 206/461 |
| 6,398,026 B1 * | 6/2002 | Parsons | B65D 77/0413 206/349 |
| 6,467,623 B1 | 10/2002 | Lewis et al. | |
| 6,484,875 B1 * | 11/2002 | Brainerd | B65D 75/322 206/232 |
| 6,520,337 B2 * | 2/2003 | Smith | B65D 81/113 206/470 |
| 6,622,864 B1 * | 9/2003 | Debbs | A61L 2/26 206/363 |
| 6,629,608 B2 | 10/2003 | Hurley et al. | |
| 6,705,469 B2 | 3/2004 | Slot | |
| 6,722,502 B1 | 4/2004 | Newman | |
| 6,830,149 B2 * | 12/2004 | Merboth | A01N 1/02 206/438 |
| 6,840,381 B2 | 1/2005 | Stephens | |
| 7,014,047 B2 | 3/2006 | Stapleton | |
| 7,216,765 B2 | 5/2007 | Markert et al. | |
| 7,255,230 B1 * | 8/2007 | Appelbaum | B65D 73/0057 206/463 |
| 7,306,101 B2 | 12/2007 | Murry | |
| 7,328,800 B2 * | 2/2008 | Koike | B65D 5/5088 206/521 |
| 7,383,952 B2 | 6/2008 | Kruelle et al. | |
| D596,485 S * | 7/2009 | Andre | D9/737 |
| 7,571,808 B2 * | 8/2009 | Kong | B65D 81/053 206/454 |
| 7,624,873 B2 * | 12/2009 | Tennant | A61B 10/0096 206/523 |
| 7,686,169 B1 * | 3/2010 | Harte | B65D 81/03 206/453 |
| 7,866,478 B2 * | 1/2011 | Rohrbach | B65D 81/053 206/586 |
| 7,878,326 B2 * | 2/2011 | Andre | B65D 25/10 206/320 |
| 8,083,058 B2 * | 12/2011 | Marcinkowski | B65D 77/26 206/352 |
| 8,109,389 B1 * | 2/2012 | Amer | B65D 5/5038 206/499 |
| 8,439,197 B2 * | 5/2013 | Yajima | B65D 81/133 206/454 |
| 8,573,397 B1 * | 11/2013 | Fager | B65D 71/14 206/320 |
| 8,602,216 B1 * | 12/2013 | Lin | B65D 85/00 206/464 |
| D705,049 S * | 5/2014 | Akana | D9/418 |
| 8,844,726 B2 | 9/2014 | Andre et al. | |
| D738,204 S * | 9/2015 | Akana | D9/418 |
| 9,199,776 B1 * | 12/2015 | Bruce | B65D 75/322 |
| 2001/0020595 A1 * | 9/2001 | Koike | B65D 81/025 206/521 |
| 2001/0030141 A1 * | 10/2001 | Kasakura | B65D 81/133 206/592 |
| 2002/0189970 A1 * | 12/2002 | Koike | B65D 81/133 206/592 |
| 2003/0029766 A1 * | 2/2003 | Abe | B65D 77/02 206/455 |
| 2003/0038054 A1 | 2/2003 | Hurley et al. | |
| 2004/0094448 A1 * | 5/2004 | Koike | B65D 5/5088 206/521 |
| 2004/0262193 A1 | 12/2004 | Korhonen | |
| 2005/0211600 A1 | 9/2005 | Saito | |
| 2006/0032777 A1 * | 2/2006 | Russell | B65D 5/5035 206/521 |
| 2006/0186011 A1 * | 8/2006 | Palmer | G11B 33/0422 206/461 |
| 2006/0243636 A1 | 11/2006 | Robichaud et al. | |
| 2006/0278551 A1 * | 12/2006 | Bianchini | B65D 75/22 206/463 |

(56) References Cited

U.S. PATENT DOCUMENTS

| | | | |
|---|---|---|---|
| 2007/0051652 A1* | 3/2007 | Tilton | B65D 73/0092 206/462 |
| 2007/0051662 A1 | 3/2007 | Millar-Sax et al. | |
| 2007/0125678 A1* | 6/2007 | Green | B65D 73/0057 206/461 |
| 2007/0284281 A1* | 12/2007 | Shimazu | B65D 5/5035 206/592 |
| 2008/0142396 A1* | 6/2008 | Li | B65D 81/113 206/488 |
| 2009/0166248 A1* | 7/2009 | Onda | H01L 21/67369 206/587 |
| 2009/0218254 A1* | 9/2009 | Andersen | G03F 1/66 206/724 |
| 2009/0304753 A1* | 12/2009 | Tsabari | A61J 3/071 424/400 |
| 2010/0187149 A1* | 7/2010 | Tsukii | B65D 5/505 206/521 |
| 2011/0049007 A1* | 3/2011 | Liao | B65D 81/113 206/723 |
| 2012/0111763 A1* | 5/2012 | Cummings | B65D 5/503 206/585 |
| 2012/0187026 A1* | 7/2012 | Nazari | B65D 73/0092 206/778 |
| 2013/0213843 A1* | 8/2013 | Knight | A61B 19/46 206/438 |
| 2014/0008257 A1* | 1/2014 | Chen | B65D 81/127 206/454 |
| 2014/0102939 A1* | 4/2014 | Lee | C12M 23/00 206/525 |

* cited by examiner

MOLDED FIBER PACKAGING

FIELD

The described embodiments relate generally to packaging for a consumer product. More particularly, the embodiments relate to packaging that displays a product in an aesthetically appealing way.

BACKGROUND

Packaging for consumer products protects products from damage and facilitates brand recognition. Effective packaging can be an important marketing tool used to attract and retain customers.

SUMMARY

Packaging for consumer products protects products from damage and facilitates brand recognition. Packaging should provide adequate protection for a product during shipping and handling. Additionally, effective packaging can be an important marketing tool used to attract customers. Packaging should hold and display a product in an aesthetically appealing way that catches a consumer's attention. Effective packaging should catch a consumer's attention and focus that attention on the product rather than the packaging itself.

Environmental considerations may play a role in designing packaging. For example, packaging may be designed to be environmentally friendly. Packaging made out of recyclable and/or biodegradable materials can reduce environmental impact. Maintaining desired aesthetics and function of packaging in view of such environmental considerations can be a challenge.

The packaging according to embodiments described herein, or elements thereof, accomplish one or more of these and other objectives.

Some embodiments include packaging for a product including a lid having an exterior shell and a lid insert, a pedestal having a frame, a base attached to the frame, and a pedestal insert disposed between the frame and the base and coupled to (e.g., by adhesive bonding) at least one of the frame or the base. The lid being configured to receive at least a portion of the pedestal. At least one of the exterior shell, the lid insert, the frame, or the base may be made of molded fiber paper. The molded fiber paper may comprise 60% to 70% bamboo fibers and 30% to 40% bagasse fibers.

In some embodiments, the frame includes a chamfered bottom edge and the base includes a chamfered side edge. In some embodiments, the chamfered angle of the chamfered bottom edge of the frame is complementary to the chamfered angle of the chamfered side edge of the base.

In some embodiments, the frame includes a top wall, a side wall surrounding the top wall, and a convex curved wall connecting the top wall and the side wall.

In some embodiments, the packaging includes a packaged product in contact with the top wall. A perimeter of the side wall may be equal to or no greater than a perimeter of the product. The projection area of a vertical orthographic projection of the top wall (e.g., in a direction perpendicular to the top wall) may be less than the projection area of a vertical orthographic projection of the product. In some embodiments, a perimeter of a vertical orthographic projection of the top wall and curved wall is greater than or equal to a perimeter of a vertical orthographic projection of the product.

In some embodiments, at least a portion of the lid insert is in contact with at least a portion of the side wall when the packaging is assembled.

In some embodiments, the top wall defines at least one recess for receiving an accessory, and may define a plurality of indentations configured to locate the product on the top wall. In some embodiments, the packaging includes a packaged product, where the lid insert and the frame form a cavity when the packaging is assembled, the size and shape of the cavity corresponding to the size and shape of the product. In some embodiments, no portion of the pedestal surrounds a perimeter edge of the product.

In some embodiments, the frame and/or the base is a monolithic piece.

Some embodiments include a pedestal for holding a product, the pedestal including a frame and a base attached to the frame, the frame including a top wall, a side wall surrounding the top wall, and a convex curved wall connecting the top wall and the side wall. The top wall of the pedestal may be configured to hold the product and a perimeter of the side wall may be no greater than a perimeter of the product. In some embodiments, the base and frame together define a cavity and the pedestal insert is disposed in the cavity. In some embodiments, the cavity is completely enclosed by the frame and the base.

Some embodiments include a method of making molded fiber packaging including forming a pedestal. The pedestal may be formed using operations including: forming a molded fiber paper green body of a frame, the frame having a top wall surrounded by a side wall, the side wall having a bottom edge; forming a molded fiber paper green body of a base, the base comprising a side edge; drying the green body of the frame and the green body of the base; chamfering the bottom edge of the fame; chamfering the side edge of the base such that the chamfered side edge of the base is complimentary to the chamfered bottom edge of the frame; and assembling the frame and the base by adhering the frame to the base such that the chamfered bottom edge of the side wall is coupled to the chamfered side edge of the base.

In some embodiments, the method includes forming a lid. The lid may be formed using operations including: forming a molded fiber paper green body of an exterior shell; forming a molded fiber paper green body of a lid insert; drying the green body of the exterior shell and the green body of the lid insert; and adhering the exterior shell to the lid insert.

In some embodiments, the method includes assembling the lid and the pedestal by placing the lid over the pedestal. In some embodiments, the lid is configured to receive at least a portion of the pedestal. In some embodiments, the lid is configured to receive the entire pedestal. In some embodiments, at least a portion of the lid insert is in contact with at least a portion of the side wall when the packaging is assembled.

In some embodiments, the method includes forming a pedestal insert and adhering the pedestal insert to either the frame or the base before assembling the frame and the base.

In some embodiments, the base and frame together define a cavity, where the pedestal insert is disposed in the cavity and adheres to both the frame and the base when the frame and the base are assembled.

In some embodiments, the green body of the frame and the green body of the base are formed using a first set of molds. In some embodiments, the frame and the base are dried in a second set of molds while applying heat and pressure.

BRIEF DESCRIPTION OF THE DRAWINGS

The disclosure will be readily understood by the following detailed description in conjunction with the accompanying drawings, where like reference numerals designate like structural elements, and in which.

DETAILED DESCRIPTION

Figure 1:
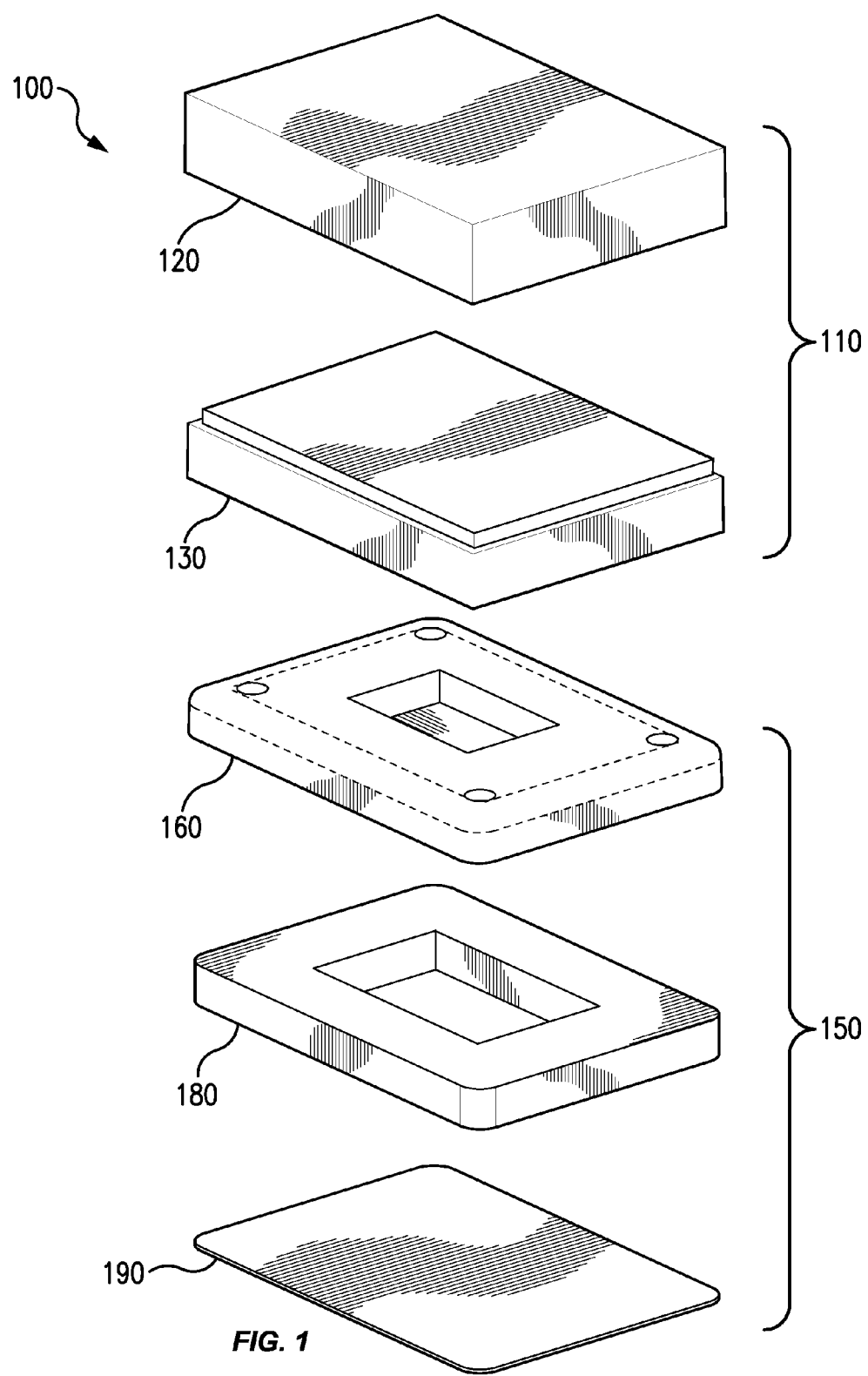
FIG. 1 shows an exploded view of packaging according to an embodiment.

Reference will now be made in detail to representative embodiments illustrated in the accompanying drawings, in which like reference numerals are used to indicate identical or functionally similar elements. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

References to "one embodiment," "an embodiment," "some embodiments," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The packaging described herein may be used to hold and ship items, such as, for example, consumer products. The packaging is structurally robust and protects the product during shipping and handling. The packaging may form an internal cavity shaped to conform to the shape of the product. Shaping the internal cavity in this way may prevent the product from moving during shipping and handling, thereby preventing damage to the product. The packaging may be made of lightweight material, which reduces shipping cost. Additionally, the packaging can include components having complementary edges that are coupled together when the packaging is assembled. Complementary edges aid in concealing seams between different components of the packaging, making at least a portion of the packaging look like a single monolithic piece when in fact it may be composed of various pieces. Complementary edges may also increase the structural integrity of the packaging.

The packaging described herein may also present and display the product in an aesthetically appealing way, promoting a continuity in user experience from packaged product to user device in an ordered and intuitive way during the unboxing process. In some embodiments, the packaging may include a pedestal configured to hold the product in a way that makes it appear as if the product is "floating" above the pedestal. A "floating" product catches a consumer's eye and focuses their attention on the product itself rather than the packaging. A "floating" product may also indicate to a consumer that a certain product is associated with a specific brand. In other words, the "floating" product may spark brand recognition that attracts consumers.

Furthermore, the packaging described herein may be made of recyclable and/or biodegradable material that reduces the environmental impact of the packaging. In some embodiments, at least one component of the packaging may be made from molded fiber paper.

These and other embodiments are discussed below with reference to FIGS. 1-13. However, those skilled in the art will readily appreciate that the detailed description given herein with respect to these figures is for explanatory purposes only and should not be construed as limiting.

Figure 2:
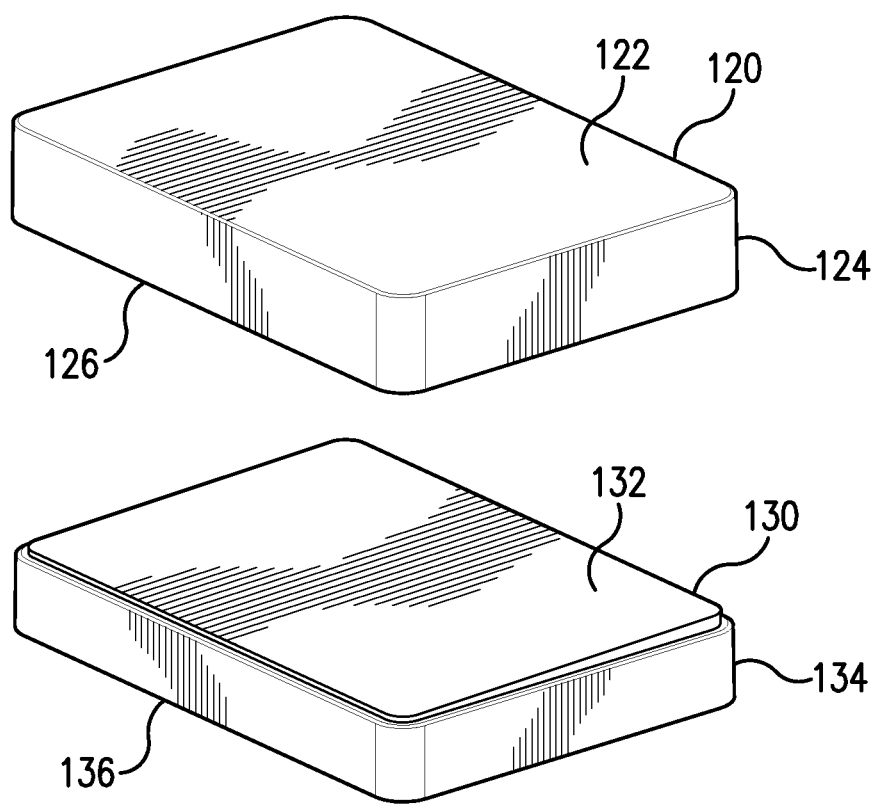
FIG. 2 shows an exploded view of a packaging lid according to an embodiment.
Figure 3:
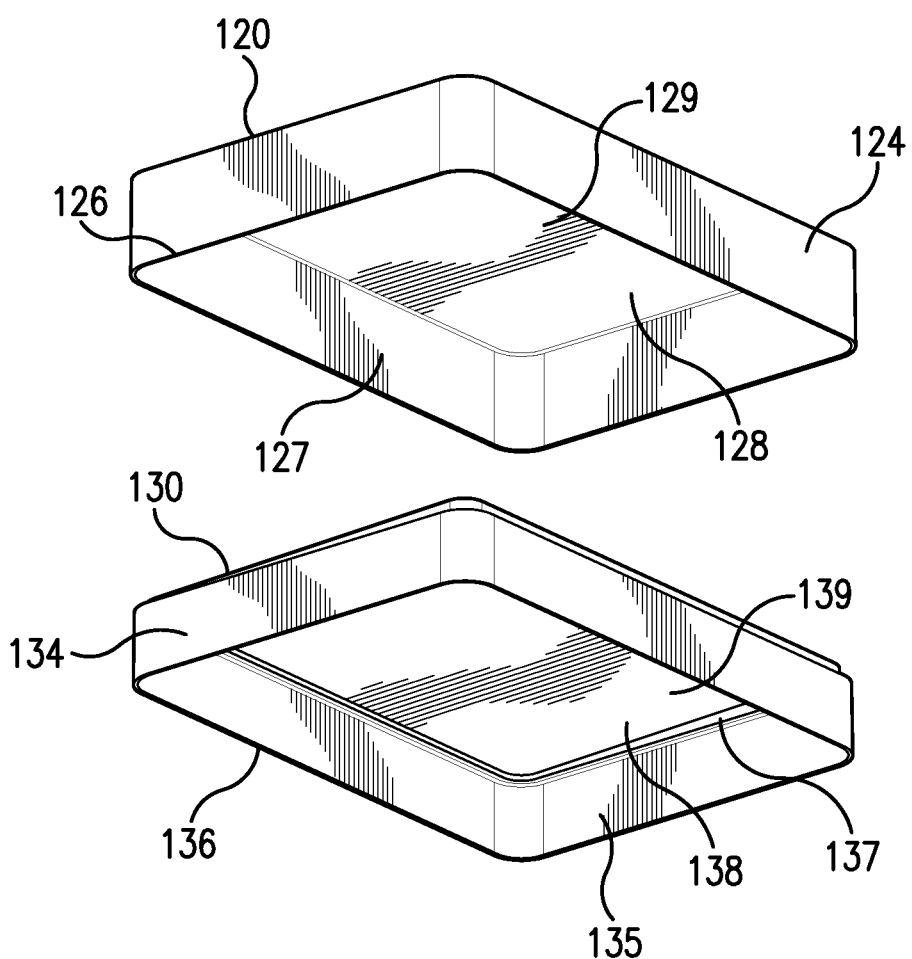
FIG. 3 shows an exploded view of a packaging lid according to an embodiment.
Figure 4:
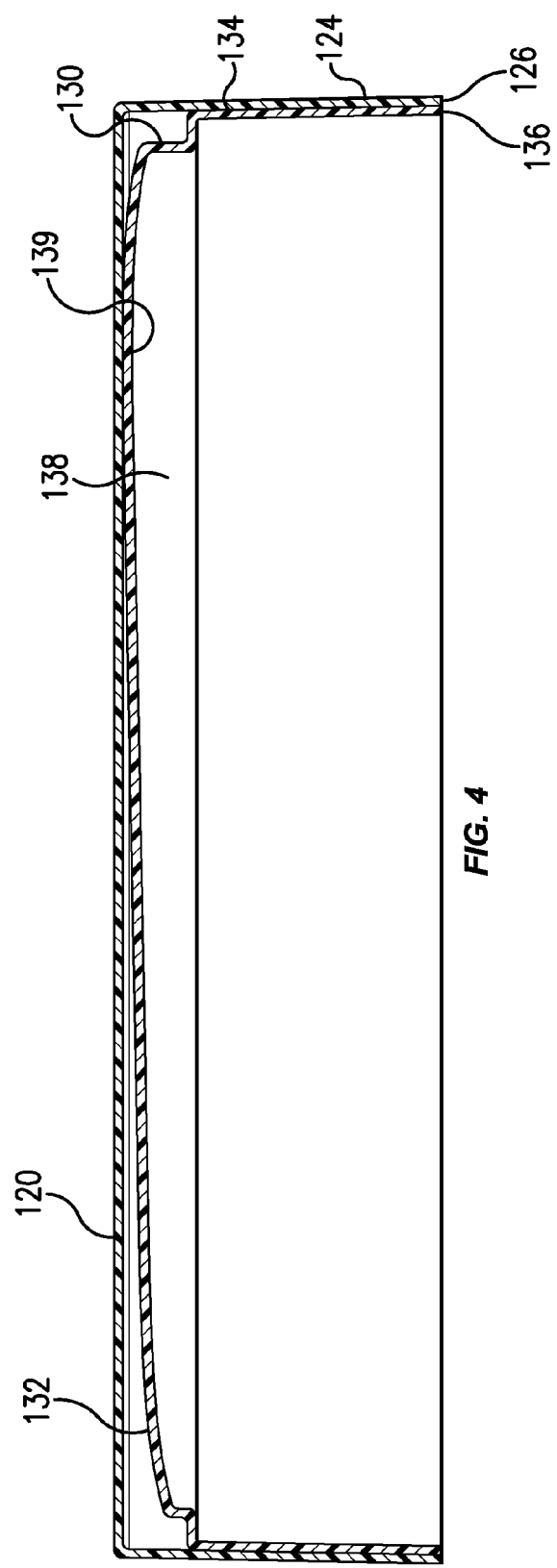
FIG. 4 shows an assembled cross-sectional view of a packaging lid according to an embodiment.

Embodiments of the present invention include packaging 100 for protecting and displaying consumer products. As shown in FIG. 1, packaging 100 may include a lid 110 and a pedestal 150. The lid may be composed of an exterior shell 120 and a lid insert 130. In some embodiments, as shown in FIGS. 2-4, the exterior shell 120 and the lid insert 130 are separate monolithic pieces that are bonded together, using for example, an adhesive, tape, or welding. In some embodiments, exterior shell 120 and lid insert 130 may be a single integrally formed monolithic piece. Exterior shell 120 includes an exterior top surface 122, an exterior side surface 124, and a shell edge 126. In some embodiments, exterior top surface 122 and/or exterior side surface 124 include indicia, including, for example, logos, brand names or colors, or product names. Exterior shell 120 also includes a lid cavity 128 having an interior side surface 127 and an interior top surface 129, lid cavity 128 being configured to receive at least a portion of lid insert 130. In some embodiments, lid cavity 128 may receive the entire lid insert 130.

As shown in FIGS. 2 and 3, lid insert 130 includes a top surface 132, a side surface 134, and an insert edge 136. Lid insert 130 also includes an insert cavity 138 having a side surface 135 and a top surface 139. In some embodiments, top surface 139 may be shaped that so that it conforms to the exterior shape of a product 200. In some embodiments, top surface 139 may include a flange or cavity 137 that conforms to the exterior shape of product 200 (see FIG. 12). A top surface 139 that conforms to the exterior of a product 200 helps prevent the product 200 from moving or shifting during shipping and handling, thereby reducing potential damage to the product 200 and maintaining the product in the desired position for presentation upon opening the packaging. Insert cavity 138 may be configured to receive at least a portion of pedestal 150 when packaging 100 is assembled. In some embodiments, insert cavity 138 may be configured to receive the entire pedestal 150 along with product 200 (see FIG. 12). In embodiments where exterior shell 120 and lid insert 130 are separate pieces, differently shaped lid inserts 130 may be interchanged during assembly to accommodate differently shaped products without having to alter the exterior shell 120.

FIG. 4 shows exterior shell 120 and lid insert 130 assembled according to an embodiment. As shown in FIG. 4, exterior shell 120 may receive the entire lid insert 130 such that shell edge 126 aligns with insert edge 136. When exterior shell 120 and lid insert 130 are assembled, side surface 134 of lid insert 130 may couple with (e.g., be in contact with) interior side surface 127 of exterior shell 120 and at least a portion of top surface 132 may couple with (e.g., be in contact with) interior top surface 129 of lid cavity 128. Exterior shell 120 and lid insert 130 may be bonded together at the interface between side surface 134 of lid insert 130 and interior side surface 127 of exterior shell 120 and/or at the interface between top surface 132 of lid insert 130 and interior top surface 129 of exterior shell 120.

Figure 5:
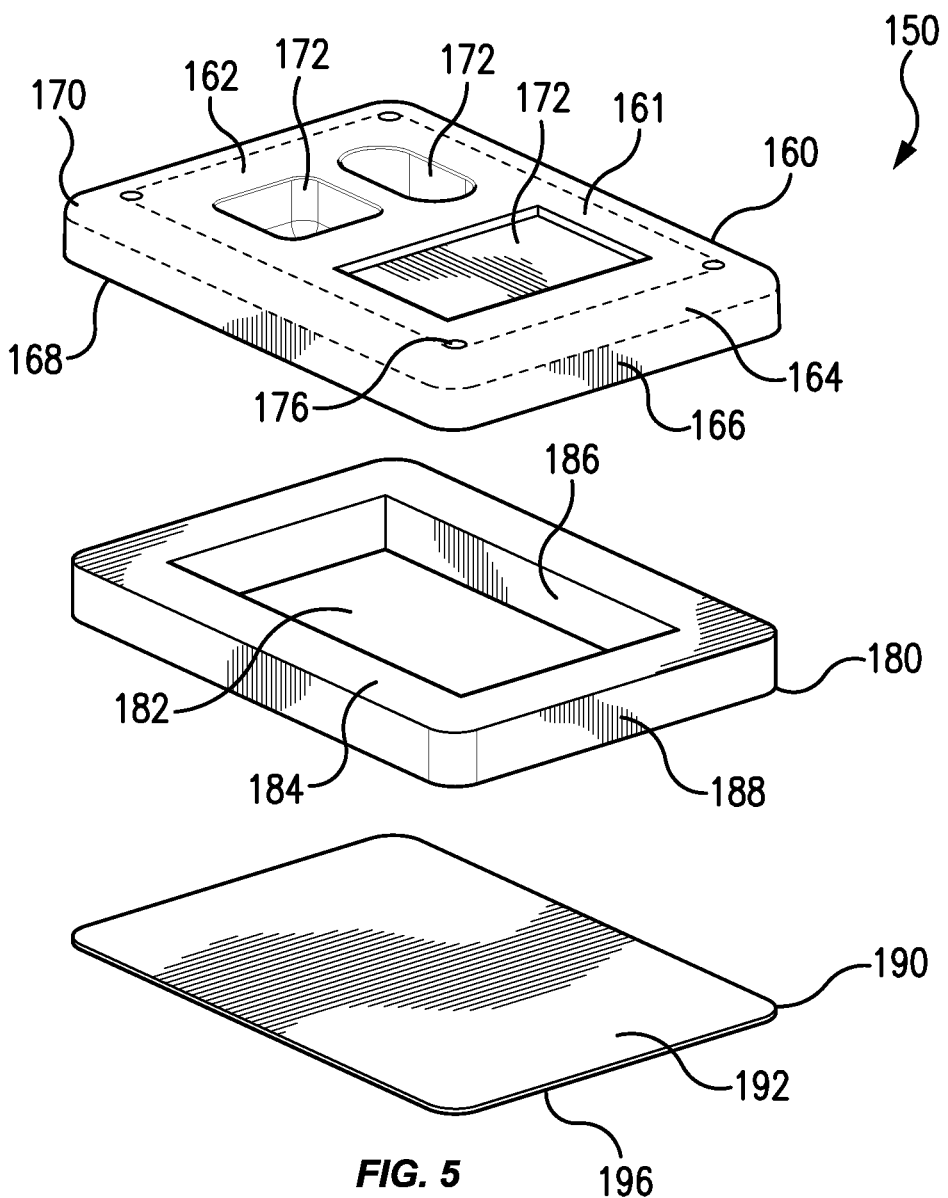
FIG. 5 shows an exploded view of a packaging pedestal according to an embodiment.
Figure 6:
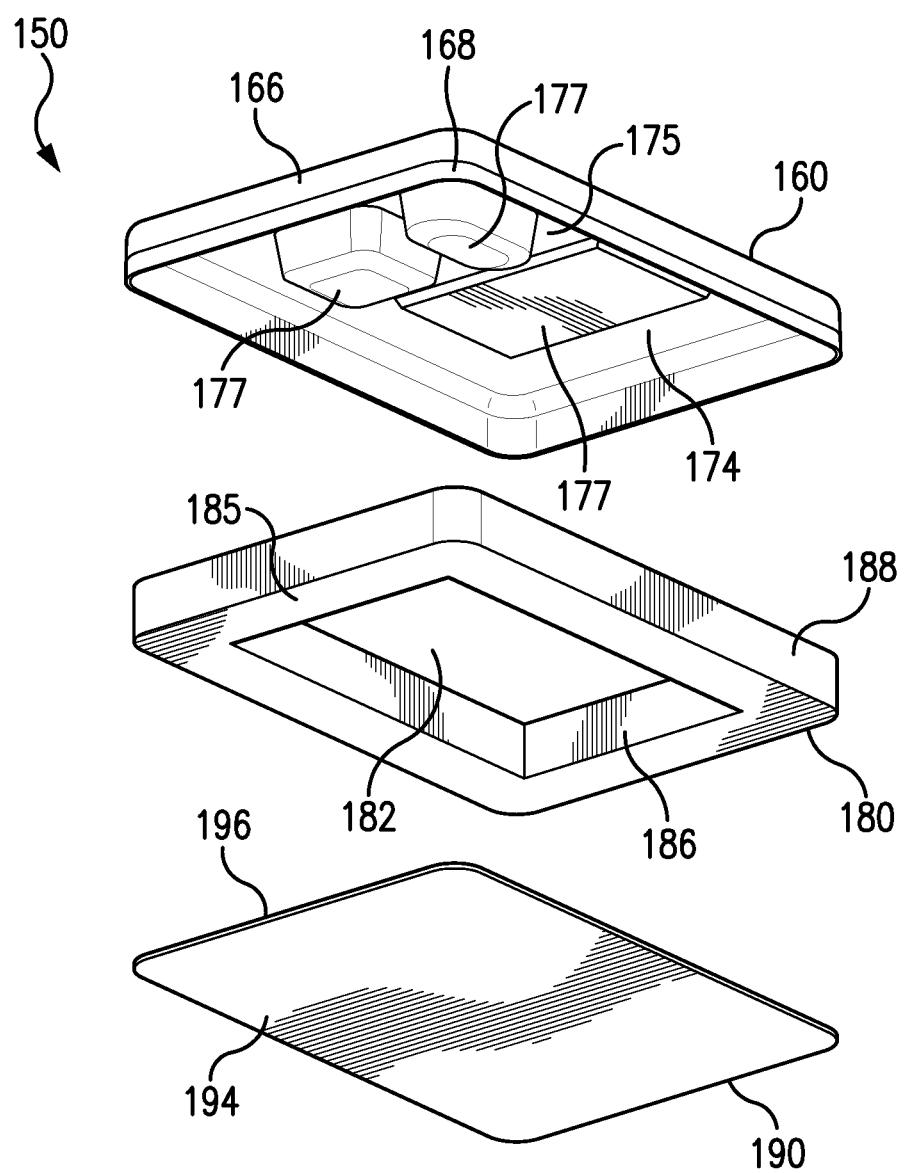
FIG. 6 shows an exploded view of a packaging pedestal according to an embodiment.
Figure 7:
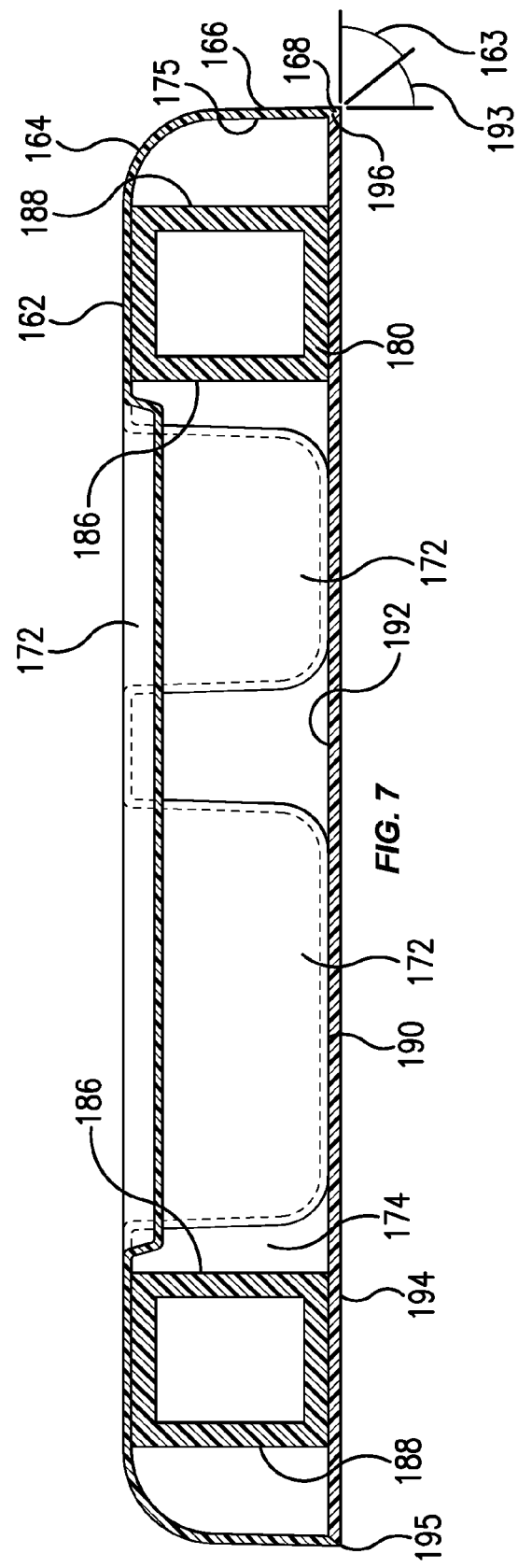
FIG. 7 shows a cross-sectional view of a packaging pedestal according to an embodiment.

FIGS. 5-7 show pedestal 150 according to an embodiment. Pedestal 150 may include a pedestal frame 160, a pedestal insert 180, and a base 190. Pedestal frame 160, pedestal insert 180, and base 190 may be separate monolithic pieces that are bonded together, using for example, adhesive, tape, or welding.

Pedestal frame 160 may include a continuous outer surface 161 defined by a top wall 162, a convex curved wall 164, and a side wall 166, side wall 166 including a bottom edge 168. In some embodiments, frame 160 is a single monolithic piece. In other words, top wall 162, convex curved wall 164, and side wall 166 are formed as a single piece using, for example, casting, molding, and/or machining. In some embodiments, bottom edge 168 may be chamfered so as to couple with a side edge 196 of base 190 (described further below).

Top wall 162 may include at least one recess 172 for housing accessories, such as, for example, a power cord, a USB cord, or an instruction manual. Top wall 162 may also include at least one indentation 176 for locating product 200 in the correct intended position on top wall 162. For example, top wall 162 may include four indentations 176 for receiving corresponding protrusions (e.g., "feet") on the bottom of product 200. Indentations 176 may ensure that product 200 is properly aligned in an aesthetically appealing intended location on top wall 162. While FIG. 4 shows four indentations 176, any number of indentations 176 may be present on top wall 162. In some embodiments, proper positioning of product 200 may be achieved through protrusions on top wall 162 to be received by indentations in product 200.

As shown in FIG. 5, convex curved wall 164 surrounds top wall 162 and separates top wall 162 from side wall 166. Side wall 166 surrounds top wall 162 and extends from convex curved wall 164 to bottom edge 168. In some embodiments, side wall 166 is oriented in a direction perpendicular to top wall 162. Convex curved wall 164 may have any radius of curvature. In some embodiments, the radius of curvature of convex curved wall 164 is between 1 mm and 10 mm. In some embodiments, the radius of curvature of convex curved wall 164 is between 7 mm and 10 mm. In some embodiments, the radius of curvature of convex curved wall 164 is between 8 mm and 9 mm. Convex curved wall 164 also includes rounded corners 170. In some embodiments top wall 162 and side wall 166 each extend tangent to convex curved wall 164. Wall 164 is shown having a convex curve for exemplary purposes. Wall 164 need not have a convex curve, but in some embodiments may instead have a different shape, such as, for example, a chamfer, one or more steps, or a concave curve.

As shown in FIG. 6, the underside of pedestal frame 160 may include a frame cavity 174 having a cavity surface 175. Cavity surface 175 may have projections 177 corresponding to recesses 172 on top wall 162. Frame cavity 174 may be sized and shaped to receive pedestal insert 180. In some embodiments pedestal insert 180 may include a hollow interior 182 for receiving projections 177. Pedestal insert 180 may also include a top wall 184, a bottom wall 185, an interior side wall 186, and an exterior side wall 188 defining a hollow three-dimensional shape. Pedestal insert 180 may provide structural support for pedestal 150. For example, pedestal insert may help prevent damage to product 200 should packaging 100 be dropped during shipping or handling by inhibiting flexure of frame 160. In some embodiments, pedestal insert 180 is bonded to at least one of pedestal frame 160 or base 190.

As shown in FIGS. 5 and 6, base 190 includes an upper surface 192, a lower surface 194, and side edge 196. Side edge 196 may chamfered so as to couple with bottom edge 168 of pedestal frame 160. When base 190 and frame 160 are assembled, as shown in FIG. 7, base 190 closes the bottom end of cavity 174. In other words, frame 160 and base 190 define and completely enclose cavity 174. In some embodiments, base 190 may be a single monolithic piece.

FIG. 7 shows an assembled view of pedestal 150 according to an embodiment. As shown in FIG. 7, bottom edge 168 includes a chamfer that complements a chamfer on side edge 196 of base 190. The chamfer on bottom edge 168 and side edge 196 may have complementary angles (i.e., any angles as long as the sum of the chamfer angles on bottom edge 168 and side edge 196 equals 90°). In some embodiments bottom edge 168 may have a chamfer angle 163 of 45° and side edge 196 may have a chamfer angle 193 of 45°. In some embodiments, bottom edge 168 may have a chamfer angle 163 of 30° and side edge 196 may have a chamfer angle 193 of 60°. Chamfering edges 168 and 196 creates an aesthetically appealing, crisp, and robust edge for assembled pedestal 150. Chamfered edges 168 and 196 aid in concealing seams between different components of pedestal 150 (e.g., seam 195) and make pedestal 150 look like a single solid piece. In some embodiments, edges 168 and 196 are not chamfered and/or are not coupled together when pedestal is assembled. In such embodiments, bottom edge 168 may couple with upper surface 192 or side edge 196 may couple with cavity surface 175.

As shown in FIG. 7, pedestal insert 180 may contact upper surface 192 of base 190 and cavity surface 175 of pedestal frame 160. Contact between the pedestal insert 180, upper surface 192 and cavity surface 175 provides increased structural support for packaging 100. In some embodiments, pedestal insert 180 may be bonded to at least one of upper surface 192 or cavity surface 175 using for example, adhesive, tape, or welding.

Figure 8:
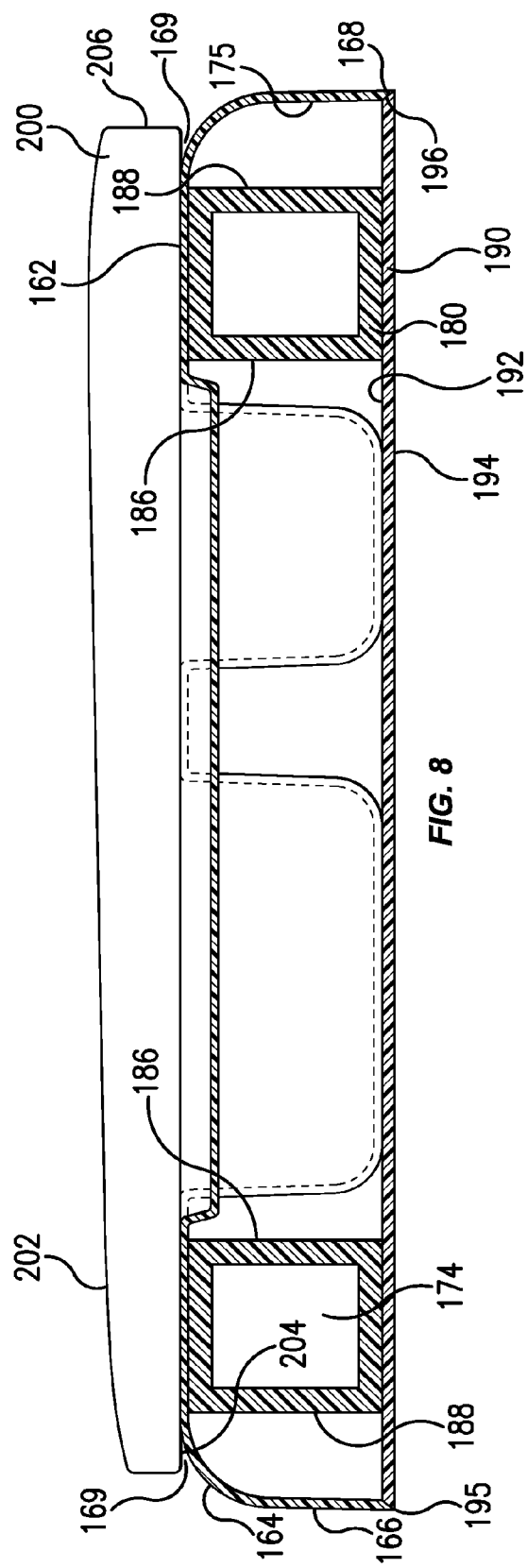
FIG. 8 shows cross-sectional view of a packaging pedestal and a product according to an embodiment.

FIG. 8 shows pedestal 150 supporting product 200 according to an embodiment. Product 200 may be disposed on pedestal 150 such that it is supported by top wall 162. The surface area of top wall 162 may be sized such that product 200 extends outward from top wall 162 and extends over convex curved wall 164, thereby forming a gap 169 between convex curved wall 164 and product 200. In other words, product 200 may sit proud above convex curved wall 164, with no packaging around the sides or top of product 200 when lid 110 is removed. This makes the product look like it is "floating" on top of pedestal 150. A "floating" product may be aesthetically appealing and servers to draw a consumer's attention to the product 200 rather than pedestal 150 used to hold product 200, to promote an ordered and intuitive unboxing process. Features of the size and shape of top wall 162, convex curved wall 164, and side wall 166 used to create a "floating" product 200 is further described in reference to FIGS. 9-11.

Figure 9:
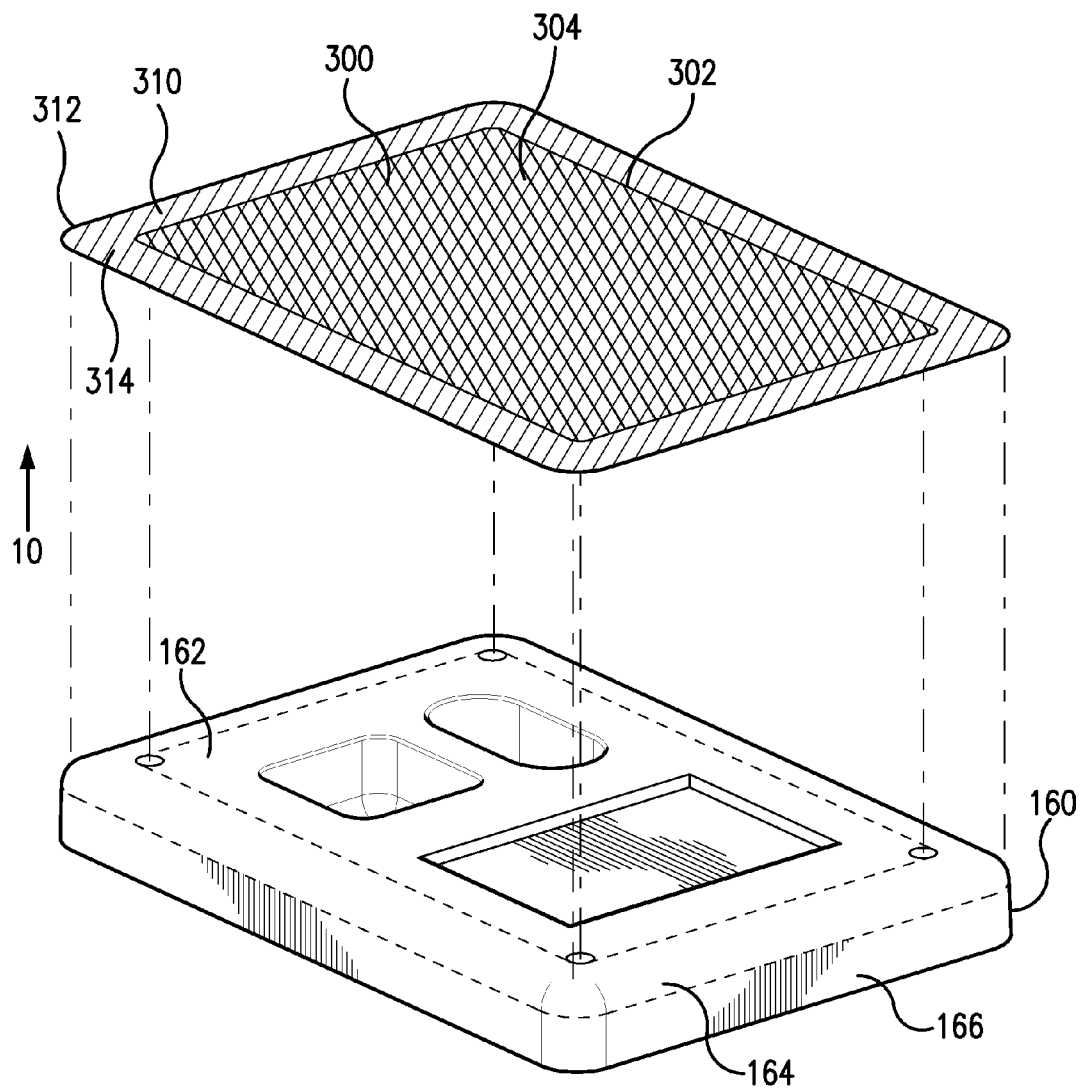
FIG. 9 shows a packaging pedestal and a two-dimensional orthographic projection thereof according to an embodiment.
Figure 10:
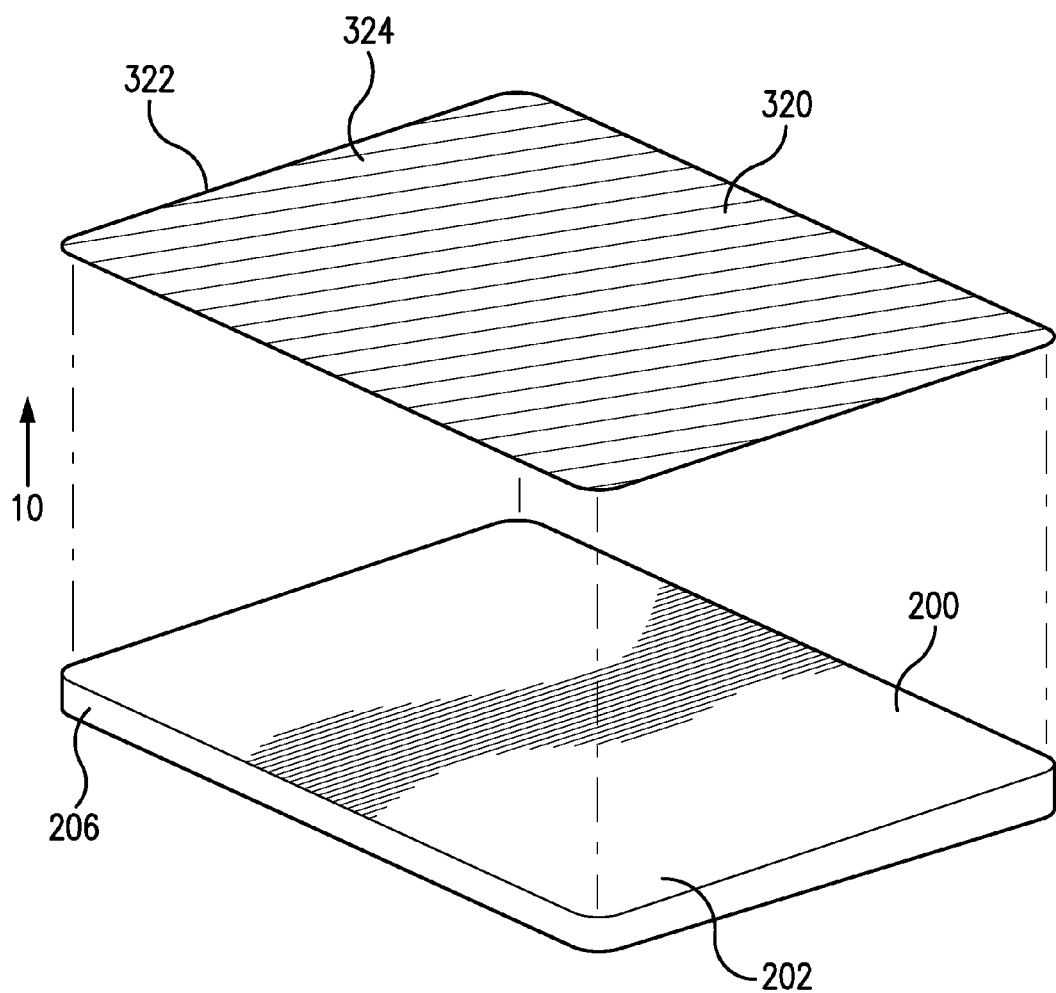
FIG. 10 shows a product and a two-dimensional orthographic projection thereof according to an embodiment.

FIG. 9 shows two-dimensional orthographic projections of top wall 162 and convex curved wall 164 in a vertical direction 10 (e.g., perpendicular to the major part of top wall 162, or to upper surface 192 of base 190). Orthographic projection 300 is a two-dimensional orthographic projection of top wall 162 having a perimeter 302 and a projection area 304. Orthographic projection 310 is a two-dimensional orthographic projection of top wall 162 and convex curved wall 164 together, and has a perimeter 312 and a projection area 314 (which includes projection area 304). Projection area 314 may encompass the vertical orthographic projection of side wall 166. Since convex curved wall 164 surrounds top wall 162, orthographic projection 310 encompasses orthographic projection 300 and surrounds orthographic projection 300 on all sides. FIG. 10 shows a two-dimensional orthographic projection 320 of product 200 in vertical direction 10 when product 200 is positioned on top wall 162, like in FIG. 8. Orthographic projection 320 has a perimeter 322 and a surface area 324.

Figure 11:
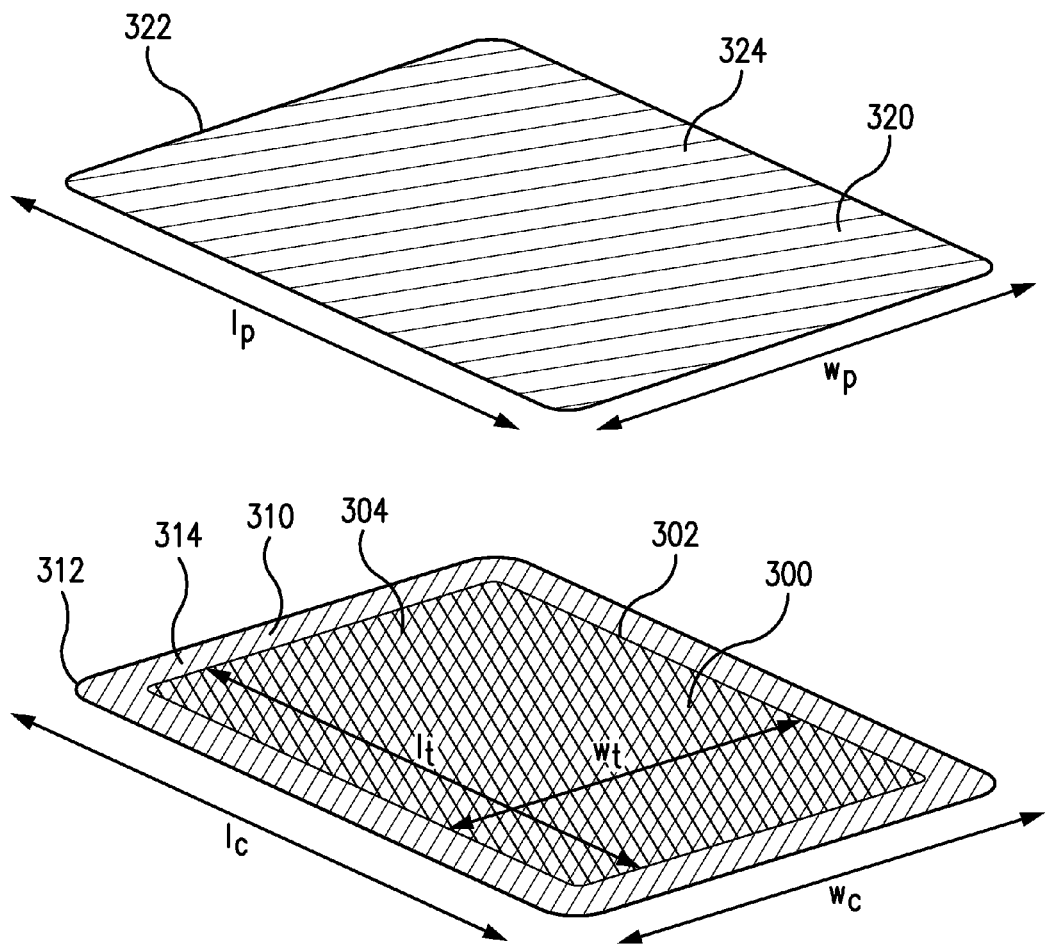
FIG. 11 shows a comparison of the two-dimensional orthographic projection of FIG. 9 and the two-dimensional orthographic projection of FIG. 10.

FIG. 11 shows the relative sizes of projection areas 304, 314, and 324 according to an embodiment. Projection area 304 of orthographic projection 300 for top wall 162 has a length ($l_t$) and a width ($w_t$). Projection area 314 of orthographic projection 310 for top wall 162 and convex curved wall 164 together has a length ($l_e$) and a width ($w_e$). Projection area 324 of orthographic projection 320 for product 200 has a length ($l_p$) and a width ($w_p$). For embodiments designed to display a "floating" product, the relationship between these lengths and widths may be represented using one or both of the following inequalities: (1) $l_e > l_p > l_t$; and (2) $w_e > w_p > w_t$.

If inequalities (1) or (2) are true, product 200 will extend over convex curved wall 164, in at least one of the length or width directions. If both inequalities (1) and (2) are true, product 200 will extend over convex curved wall 164 in both of the length and width directions, thus creating gap 169 all the way around curved wall 164, but will not extend past side wall 166. In some embodiments, projection area 314 and perimeter 312 of orthographic projection 310 are greater than or equal to surface area 324 and perimeter 322 of orthographic projection 320. Such a configuration allows lid 110 to fit over product 200 and contact side wall 166 when packaging is assembled.

In some embodiments, the length ($l_p$) and width ($w_p$) of orthographic projection 320 are less than the length ($l_e$) and width ($w_e$) of orthographic projection 310 (see FIG. 11). In other words, perimeter 322 of orthographic projection 320 is no greater than perimeter 312 of orthographic projection 310. In some embodiments, the length ($l_p$) and width ($w_p$) of orthographic projection 320 are equal to the length ($l_e$) and width ($w_e$) of orthographic projection 310. In other words, perimeter 324 of orthographic projection 320 is equal to perimeter 312 of orthographic projection 310.

Figure 12:
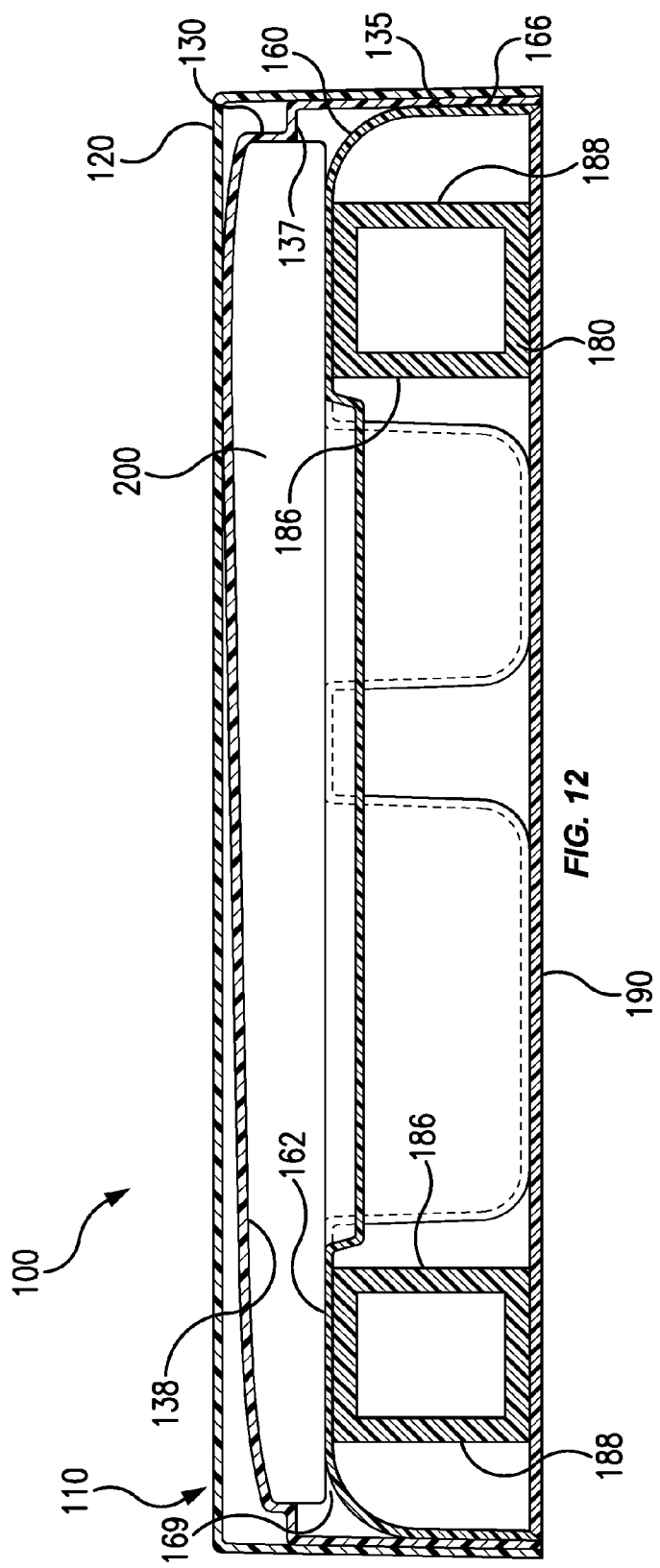
FIG. 12 shows a cross-sectional view of a product housed within packaging according to an embodiment.
Figure 13:
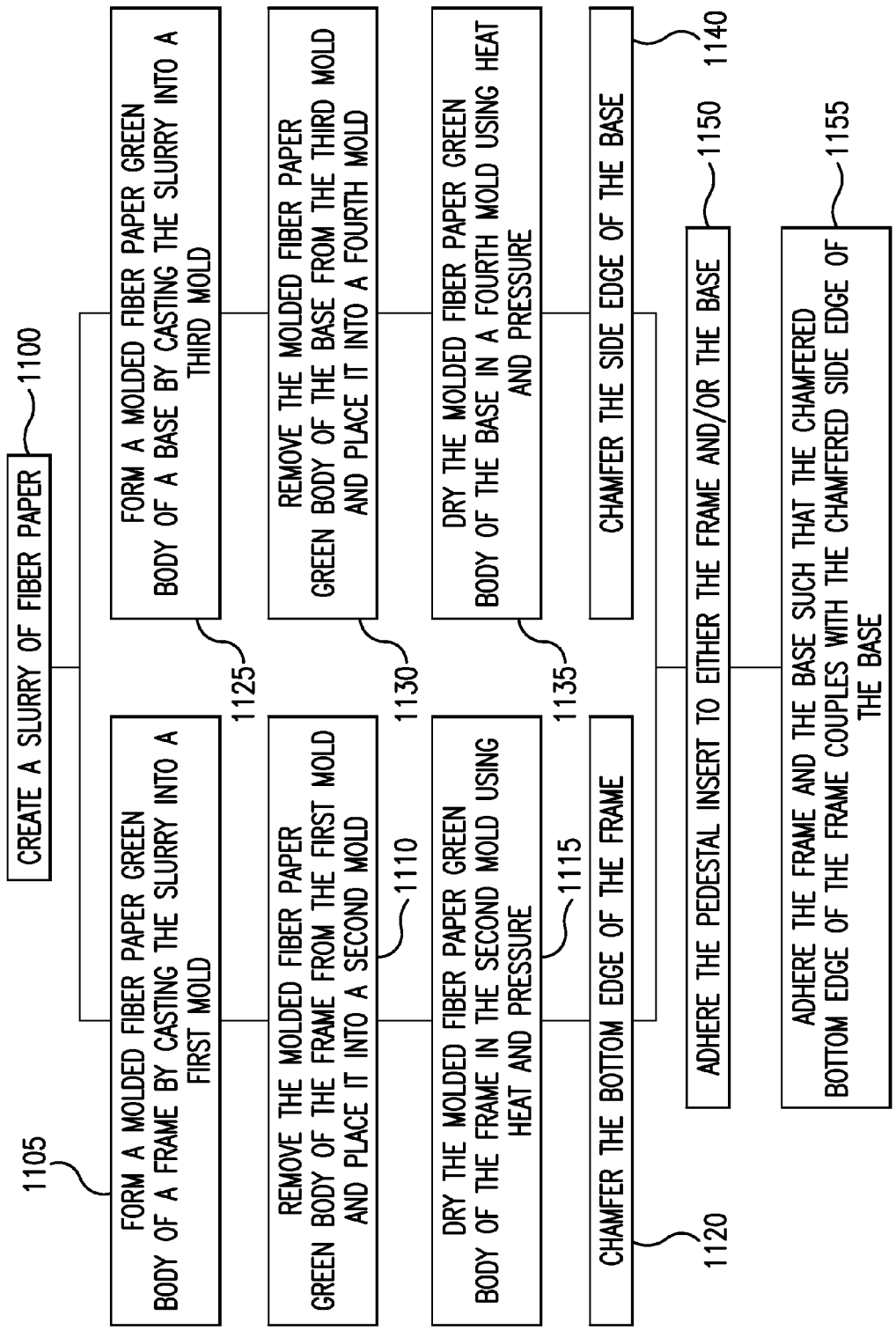
FIG. 13 shows a flowchart for a method of making a packaging pedestal according to an embodiment.

FIG. 12 shows product 200 housed within assembled packaging 100 according to an embodiment. As shown in FIG. 12, lid 110 is placed over pedestal 150 such that pedestal 150 and product 200 are completely received by insert cavity 138. Furthermore, interior side surface 135 of lid insert 130 is in contact with side wall 166. The contact between side surface 135 and side wall 166 increases the robustness of packaging 100 and prevents unwanted movement or shifting of pedestal 150 and/or product 200 during shipping and handling. In such embodiments, the height of lid 110 may be such that shell edge 126 and insert edge 136 align with lower surface 194 of base 190. Furthermore, in the embodiment shown in FIG. 12, cavity surface 139 of insert cavity 138 is sized and shaped to conform the exterior surface of product 200. Insert cavity 138 includes flange 137 that extends inward from side surface 135 so as to contact product 200 when it is positioned on top wall 162. The particular size and shape shown in the figures is exemplary—it may be modified to correspond to at least some portion of the exterior shape of a product intended to be packaged.

In some embodiments, at least one of the exterior shell 120, lid insert 130, frame 160, pedestal insert 180, or base 190 is made of molded fiber paper. The molded fiber paper may be composed of 60 wt % to 70 wt % bamboo fibers and 30 wt % to 40 wt % bagasse fibers. Making at least one of the exterior shell 120, lid insert 130, frame 160, pedestal insert 180, or base 190 out of molded fiber paper reduces the environmental impact of packaging 100 as compared to some other material choices, such as plastics, because the molded fiber paper is recyclable and biodegradable. In some embodiments, the exterior shell 120, lid insert 130, frame 160, pedestal insert 180, and base 190 are all made of molded fiber paper. In some embodiments, the exterior shell 120, lid insert 130, frame 160, and base 190 are made of molded fiber paper and pedestal insert 180 is made of a different material, such as cardboard. In some embodiments, the molded fiber paper can be made waterproof by coating it with a hydrophobic material such as wax.

In some embodiments, the exterior shell 120, lid insert 130, frame 160, pedestal insert 180, or base 190 made of molded fiber paper may be manufactured using a two-stage molding process. For exemplary purposes, the process of making pedestal 150 will be described in detail with reference to FIG. 13, but it will be understood that exterior shell 120, lid insert 130, and/or pedestal insert 180 may be made using similar techniques. In some embodiments, the two-stage molding process for frame 160 may include the below-described operations:

A slurry of fiber paper including bamboo and bagasse may be created (1100), and a molded fiber paper green (i.e., uncured) body of a frame may be created by casting the slurry into a first mold (1105). In some embodiments, the slurry may include at least bamboo fibers, bagasse fibers, and water. The density of the dried molded fiber may be altered by altering the water content of the slurry. In some embodiments, the first mold may include a top mold and a bottom mold each having a cavity with surface features corresponding to the surface features of frame 160. During operation, the slurry may be poured between the top mold and the bottom mold in order to form the green body of the frame. In some embodiments, the slurry may be compressed between the top mold and the bottom mold.

The molded fiber paper green body of the frame may be removed from the first mold and placed into a second mold (1110).

The molded fiber paper green body of the frame may be dried in the second mold using heat and pressure, thereby forming a finalized frame 160 (1115). Similar to the first mold, the second mold may have a top mold and bottom mold. However, the cavities of the second mold may have smoother surface finishes and higher tolerances than the first mold. The smoother surface finishes and higher tolerances of the second mold provide a smooth and aesthetically appealing outer surface for finalized frame 160.

Bottom edge 168 of the frame 160 may be chamfered (1120). Bottom edge 168 may be chamfered using a cutting or machining tool or may be chamfered by hand.

A molded fiber paper green body of a base may be formed by casting the slurry into a third mold (1125). The third mold may include a top mold and a bottom mold each having a cavity with surface features corresponding to the surface features of base 190. During operation, the slurry may be poured between the top mold and the bottom mold in order to form the green body of the base. In some embodiments, the slurry may be compressed between the top mold and the bottom mold.

The molded fiber paper green body of the base may be removed from the third mold and placed into a fourth mold (1130).

The molded fiber paper green body of the base may be dried in the fourth mold using heat and pressure, thereby forming finalized base 190 (1135). Similar to the third mold, the fourth mold may have a top mold and bottom mold. However, the cavities of the fourth mold may have a smoother surface finishes and higher tolerances than the first mold. The smoother surface finishes and higher tolerances of the fourth mold provide a smooth and aesthetically appealing outer surface for finalized base 190.

In some embodiments, the third and fourth molds are sized so as to make a sheet of molded fiber paper that can be cut into multiple bases. For example, the molded fiber paper green body may be formed in a third mold and dried in a fourth mold each having a surface area approximately four times the size of the final base 190.

Side edge 196 of base 190 may be chamfered such that chamfered side edge 196 is complementary to the chamfered bottom edge 168 of frame 160 (1140). Side edge 196 may be chamfered using a cutting or machining tool or may be chamfered by hand.

Pedestal insert 180 may be adhered to either frame 160 or base 190 (1150).

Frame 160 and base 190 may be assembled by adhering frame 160 to base 190 such that chamfered bottom edge 168 couples with chamfered side edge 196 (1155). Frame 160 may be adhered to base 190 using for example, adhesive and/or tape. For example, adhesive and/or tape may be applied to cavity surface 175 and/or upper surface 192 of base 190 such that the adhesive and/or tape contacts cavity surface 175 and upper surface 192 of base 190 when frame 160 and base 190 are assembled. Also for example, adhesive and/or tape may be applied to chamfered bottom edge 168 and/or chamfered side edge 196 such that the adhesive and/or tape contacts chamfered bottom edge 168 and chamfered side edge 196 when frame 160 and base 190 are assembled.

It should be understood that the order of the operations listed above is exemplary. The order of the operations may be rearranged and some operations may be omitted. For example, both the edges could be chamfered after both the frame 160 and the base 190 are finalized. Additionally, some operations may be performed concurrently. For example, frame 160 may be cast and dried at the same time as base 190 is cast and dried. In some embodiments, frame 160 and/or base 190 may be made using a single set of molds. For example, the method of making the pedestal 150 may include only a single set of molds, i.e., only the first mold and the third mold. In such embodiments, frame 160 may be cast and completely dried in the first mold and base 190 may be cast and completely dried in the third mold. In some embodiments, the method of making frame 160 and/or base 190 may include more than two sets of molds. Any number of molds may be used to perfect the surface finish, tolerances, mechanical characteristics, and/or chemical characteristics of frame 160 and/or base 190.

In some embodiments, the thickness of top wall 162, convex curved wall 164, and side wall 166 of frame 160 is between 1.5 mm and 0.1 mm. In some embodiments, the thickness of top wall 162, convex curved wall 164, and side wall 166 of frame 160 is between 0.5 mm and 0.1 mm. In some embodiments, the thickness of top wall 162, convex curved wall 164, and side wall 166 of frame 160 is 0.2 mm+/−0.05 mm. In some embodiments, the thickness of the base is between 1.5 mm and 0.1 mm. In some embodiments, the thickness of base 190 is between 0.5 mm and 0.1 mm. In some embodiments, the thickness of the base is 0.2 mm+/−0.05 mm.

Exterior shell 120 and lid insert 130 may have the same or similar thickness as frame 160 and base 190. Lid 110 may be formed by forming a molded fiber paper green body of an exterior shell, forming a molded fiber paper green body of a lid insert, drying the green body of the exterior shell and the green body of the lid insert, and adhering the exterior shell to the lid insert.

In some embodiments, at least one of the exterior shell 120, lid insert 130, frame 160, pedestal insert 180, or base 190 is made of plastic. Suitable plastics include, for example, polyethylene, polypropylene, polyurethane, polystyrene, etc. In such, embodiments, the exterior shell 120, lid insert 130, frame 160, pedestal insert 180, or base 190 may be formed using, for example, injection molding, thermoforming, and/or machining. In some embodiments, the exterior shell 120, lid insert 130, frame 160, pedestal insert 180, or base 190 are all made of plastic.

In some embodiments, pedestal 150 does not include a pedestal insert 180. In some embodiments, pedestal insert 180 is formed as an integral part of either frame 160 or base 190. For example, pedestal insert 180 may be formed on upper surface 192 of base 190. In such an embodiment, interior side wall 186 and an exterior side wall 188 may extend from upper surface 192 to the portion of cavity surface 175 on top wall 162.

In some embodiments, pedestal 150 may be a single monolithic piece. In other words, frame 160 and base 190 (with or without internal support features like pedestal insert 180) may be formed as a single piece using, for example, injection molding and/or machining. Additionally, pedestal 150 may not include cavity 174, but instead may be made of a single block of material.

The foregoing description, for purposes of explanation, used specific nomenclature to provide a thorough understanding of the described embodiments. However, it will be apparent to one skilled in the art that many of the specific details are not required in order to practice the described embodiments. Thus, the foregoing descriptions of the specific embodiments described herein are presented for the purposes of illustration and description. They are not intended to be exhaustive or to limit the embodiments to the precise forms disclosed. It will be apparent to one of ordinary skill in the art that many modifications and variations are possible in view of the above teachings.

The Detailed Description section is intended to be used to interpret the claims. The Summary and Abstract sections may set forth one or more but not all exemplary embodiments of the present invention as contemplated by the inventors, and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. Packaging for a product, the packaging comprising:
   a lid comprising an exterior shell and a lid insert; and
   a pedestal comprising a frame, a base permanently affixed to the frame, and a pedestal insert disposed between the frame and the base and coupled to at least one of the frame or the base;
   wherein the frame comprises a top wall and a perimeter side wall disposed below the top wall,
   wherein the lid is configured to receive at least a portion of the perimeter side wall of the frame; and
   wherein the frame is a single monolithic piece made of molded fiber paper.

2. The packaging of claim 1, wherein the frame includes a chamfered bottom edge and the base includes a chamfered side edge.

3. The packaging of claim 2, wherein the bottom edge of the frame and the side edge of the base are chamfered at complementary angles.

4. The packaging of claim 1, wherein the frame comprises a convex curved wall connecting the top wall and the perimeter side wall.

5. A packaged product comprising:
   the packaging of claim 1; and
   a product in contact with the top wall.

6. The packaged product of claim 5, wherein a perimeter of the top wall is no greater than a perimeter of the product.

7. The packaged product of claim 5, wherein a perimeter of the perimeter side wall is equal to a perimeter of the product.

8. The packaged product of claim 5, wherein the top wall has a vertical orthographic projection and the product has a vertical orthographic projection, and wherein the projection area of the vertical orthographic projection of the top wall is less than the projection area of the vertical orthographic projection of the product.

9. The packaged product of claim 5, wherein the frame comprises a curved wall connecting the top wall and the perimeter side wall, and wherein an outer perimeter of an orthographic projection of the curved wall in a direction perpendicular to the top wall is greater than or equal to a perimeter of an orthographic projection of the product in a direction perpendicular to the top wall.

10. The packaging of claim 1, wherein at least a portion of the lid insert is in contact with at least a portion of the perimeter side wall when the packaging is assembled.

11. The packaging of claim 1, wherein the top wall defines at least one recess for receiving an accessory.

12. The packaging of claim 1, wherein the top wall defines a plurality of indentations configured to locate the product on the top wall.

13. The packaging of claim 1, wherein the exterior shell, the lid insert, the frame, and the base are made of molded fiber paper.

14. The packaging of claim 1, wherein the pedestal insert is adhesively bonded to at least one of the base or the frame.

15. A packaged product comprising:
    the packaging of claim 1; and
    a product.

16. The packaged product of claim 15, wherein the lid insert and the frame form a cavity when the packaging is assembled, the size and shape of the cavity corresponding to the size and shape of the product.

17. A packaged product comprising:
    a product; and
    packaging comprising:
       a lid comprising an exterior shell and a lid insert; and
       a pedestal comprising a frame, a base attached to the frame, and a pedestal insert disposed between the frame and the base and coupled to at least one of the frame or the base;
    wherein the lid is configured to receive at least a portion of the pedestal; and
    wherein at least one of the exterior shell, the lid insert, the frame, or the base is made of molded fiber paper, and
    wherein no portion of the pedestal surrounds a perimeter edge of the product.

18. A packaged product comprising:
    a product;
    a pedestal for holding the product, the pedestal comprising:
       a frame, the frame comprising:
          a top wall;
          a side wall disposed below the top wall;
          a wall curved along its length from the top wall to the side wall; and
          a base attached to the frame; and
       a lid covering the product;
    wherein the product is disposed on the top wall of the pedestal above the side wall and curved wall; and
    wherein no portion of the side wall surrounds a perimeter edge of the product.

19. The packaged product of claim 18, further comprising a pedestal insert disposed between the frame and the base and coupled to at least one of the frame or the base.

20. The packaged product of claim 19, wherein the base and frame together define a cavity, and
    wherein the pedestal insert is disposed in the cavity.

21. The packaged product of claim 20, wherein the cavity is completely enclosed by the frame and the base.

22. The packaged product of claim 18, wherein a perimeter of the side wall is equal to a perimeter of the product.

23. The packaged product of claim 18, wherein the top wall of the frame has a vertical orthographic projection and the product has a vertical orthographic projection, and wherein the projection area of the vertical orthographic projection of the top wall of the frame is less than the projection area of the vertical orthographic projection of the product.

24. The packaged product of claim 18, wherein an outer perimeter of a vertical orthographic projection of the curved wall is greater than or equal to a perimeter of a vertical orthographic projection of the product.

25. The packaged product of claim 18, wherein the pedestal is made of molded fiber paper.

26. The packaged product of claim 18, wherein the side wall includes a chamfered bottom edge and the base includes a chamfered side edge.

27. The packaged product of claim 26, wherein the bottom edge of the side wall and the side edge of the base are chamfered at complementary angles.

28. The packaged product of claim 26, wherein the chamfered bottom edge of the side wall is coupled to the chamfered side edge of the base.

29. The packaged product of claim 18, wherein the frame is a single monolithic piece.

30. The packaged product of claim 18, wherein the top wall forms an uppermost portion of the pedestal.

\* \* \* \* \*